United States Patent [19]
Uba

[11] 4,421,832
[45] Dec. 20, 1983

[54] ELECTROCHEMICAL CELL

[75] Inventor: Toshio Uba, Denver, Colo.

[73] Assignee: The Gates Rubber Company, Denver, Colo.

[21] Appl. No.: 295,479

[22] Filed: Aug. 24, 1981

[51] Int. Cl.³ .................... H01M 2/36; H01M 6/32
[52] U.S. Cl. .................................. 429/72; 429/73; 429/118
[58] Field of Search .............. 429/72, 73, 75, 51, 429/80, 81, 110, 118

[56] References Cited

U.S. PATENT DOCUMENTS

| 2,667,527 | 1/1954 | Pucher | 429/118 |
|---|---|---|---|
| 2,932,681 | 4/1960 | Solomon | 429/72 |
| 2,991,324 | 7/1961 | Vogt | 429/94 |
| 3,230,112 | 1/1966 | Watanabe et al. | 429/57 |
| 3,291,644 | 12/1966 | Gray et al. | 429/118 |
| 3,862,861 | 1/1975 | McClelland et al. | 429/94 |
| 4,308,322 | 12/1981 | Hammar | 429/72 |

FOREIGN PATENT DOCUMENTS

| 122677 | 11/1946 | Australia | 429/57 |
|---|---|---|---|
| 1415958 | 12/1975 | United Kingdom | 429/57 |

Primary Examiner—Brian E. Hearn
Assistant Examiner—Stephen J. Kalafut
Attorney, Agent, or Firm—C. H. Castleman, Jr.; H. W. Oberg, Jr.; Raymond Fink

[57] ABSTRACT

An electrochemical cell of the limited electrolyte type is described having a cell pack comprised of the normal absorbent separator interleaved and compressed between positive and negative plates, the electrolyte absorbed within pores of the separator and plates, and a container encasing the cell pack. The cell pack has an edge or edges which abut against at least one wall portion of the container, forming an interface in which is formed channels providing passageways which promote uniform distribution of electrolyte within the cell pack at least during filling of the cell with electrolyte. Filling time is also substantially reduced.

16 Claims, 11 Drawing Figures

ELECTROCHEMICAL CELL

BACKGROUND OF THE INVENTION

This invention relates to electrochemical cells and batteries whose cell packs comprised of plates and separators are less than fully saturated with electrolyte, and a portion of the cell pack makes abutting contact with the cell or battery container, and more particularly to a means of promoting uniform distribution of the electrolyte throughout the cell pack mass.

Lead-acid cells and batteries are known in which the electrolyte is fully absorbed within porous plates and separators, substantially without any free electrolyte being present elsewhere within the cell. "Limited" or "starved" electrolyte cells capable of recombining internally evolved gases further require that residual void volume remains in the plate pore structure and usually in the separator pore structure as well. A cell of this type which employs highly absorbent microfine glass separator material, compressed between the positive and negative porous plates, and in which internal gas recombination is facilitated by a cell configuration sealed at superatmospheric pressure is described in McCelland et al. U.S. Pat. No. 3,862,861, hereby incorporated by reference. In this recombinant, limited electrolyte cell the absorbent separator material may extend beyond the edges of the plates and along the edges of the cell pack to reabsorb any temporarily freed liquid electrolyte as well as providing vibration resistance to the cell assembly and protection against short-circuiting.

Cells and batteries of the above type typically have cell packs spiralled in jelly-roll form, stacked flat in prismatic form, interleaved in accordion style or the like. With the spiral configuration the electrolyte is introduced through the central void of the spiral cell pack and then follows these paths: (1) The electrolyte travels through the separator starting at the center and spirals to the outside of the jelly-roll; (2) the acid passes through the extended separator portions both over the top and along the bottom of the plates and then up and down the separator material interleaved between the plates, finally impregnating the plate pore structure as well; and (3) the electrolyte passes directly through the separator/pasted plate/separator/pasted plate ... interfaces in a radial direction until the electrolyte has completely penetrated the wound element. The first enumerated path is inhibited by the length of the separator material and therefore the larger the cell the greater the time period required for absorption of electrolyte. The third enumerated path is slow because of the high density of the plates in comparison to the separator. The majority of the filling action takes place by the electrolyte (acid) traveling along the top and bottom surfaces of the element through the compressed separator extensions and then up and down the separator until the electrolyte meets at the middle of the separator web. Very similar paths are followed by the electrolyte in the filling of prismatic batteries except that the electrolyte reaches the bottom of the cell pack other than by going through a central void.

In some instances the above filling techniques are particularly slow and, for larger size cells, may result in nonfilling of middle portions of the cell pack -the so-called "dry band" phenomenon which not only reduces the capacity of the cell but leads to premature failure by dendritic shorting or passivation in the vicinity of the dry band.

SUMMARY OF THE INVENTION

Briefly described, the electrochemical cell of the invention includes a cell pack comprised of absorbent separator interleaved and compressed between positive and negative plates, and liquid electrolyte in limited amount absorbed within the separator and plates, and a container encasing the cell pack and having a wall portion in substantial abutting contact with an edge of the cell pack. The improvement is directed to channel means formed at the interface between the edge of the cell pack and the abutting wall portion of the container, providing at least one passageway promoting the substantially uniform distribution of electrolyte within the cell pack at least during filling of the cell with the electrolyte. In addition, electrolyte which may be temporarily expelled from the cell pack during exessive overcharge of the battery, or other abnormal operation, will be reintroduced into the passageways of the channel and be redistributed uniformly when normal charging or other operation is resumed.

BRIEF DESCRIPTION OF THE DRAWINGS

The invention in its preferred embodiments will be more particularly set forth by reference to the accompanying drawings, wherein like numerals designate like parts, and in which.

PREFERRED EMBODIMENTS OF THE INVENTION

Referring first to the embodiment of FIGS. 1-5, a cylindrical lead-acid cell is shown generally at 10 including a spirally wound (jelly-roll) cell pack 12 encased more or less snugly within an acid-resistant container comprised of jar 14, the opening of which is sealed by lid 16. The respective negative and positive terminals protrude through the lid as shown.

Figure 8:
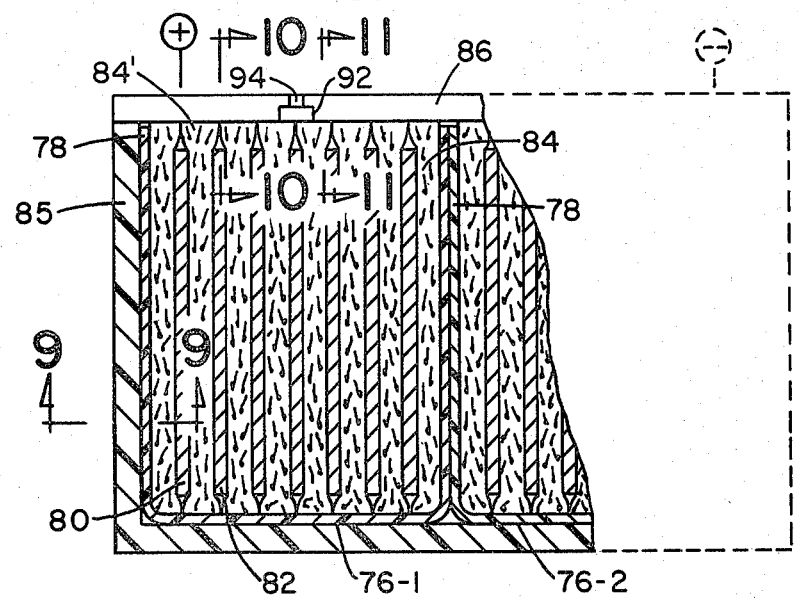
FIG. 8 illustrates an elevational, partial sectional view of an alternative embodiment of a battery in accordance with the invention.

The spirally wound cell pack 12 (an example of which is shown in more detail in FIG. 8 of Hug et al. U.S. Pat. No. 4,112,202) includes opposite polarity plates 18, 20 formed of an electrochemically active paste material 22 of porous structure adhered to a conductive grid 24. The grid is preferably formed of punched, cast or wrought high hydrogen overvoltage lead or composite grid. Interleaved between the opposite polarity plates is compressible separator material 26 which extends beyond the edges of the plates both top and bottom to define edge extension portions 28, 28'. These marginal extensions of the cell pack are in substantial abutting contact with the substantially planar bottom wall portion 30 of the container jar and/or in substantial abutting contact with the substantially planar bottom surface 32 of container lid 16. The cell pack in fact is preferably slightly oversized relative to the container whereby the top and bottom separator extension portions 28' and 28 and preferably the outer separator wrap (adjacent the container sidewall) exist in a state of compression within the container primarily for optimized vibration resistance. The cell pack is penetrated by axial void 34.

Container jar 14 and lid 16 may be encased in an outer, higher modulus container of metal or the like and an outer lid if desired. These and other details such as the plate-to-post connections, Bunsen valve venting means 41 capping electrolyte filler hole 42, and the like are shown more particularly in my U.S. Pat. No. 4,216,277, hereby incorporated by reference, and in the aforementioned McClelland et al. patent.

Figure 1:
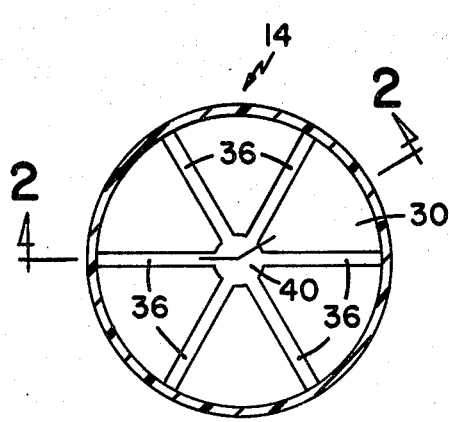
FIG. 1 is a top plan view of the inside bottom portion of a container or liner for a cylindrical cell of the invention.
Figure 2:
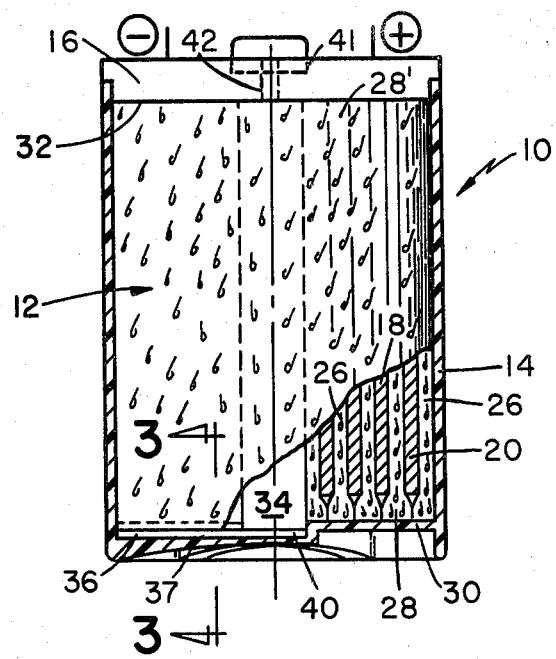
FIG. 2 is a side elevational, partial sectional view of the cell, viewed in the direction of 2—2 of FIG. 1.
Figure 3:
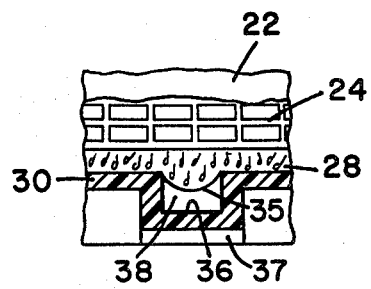
FIG. 3 is a partial sectional view along a channel of the container bottom taken along 3—3 of FIG. 2.
Figure 5:
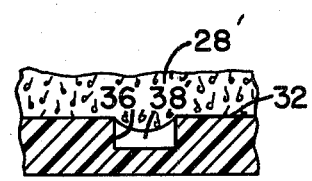
FIG. 5 is a partial sectional view along 5—5 of FIG. 4 showing a channel portion of the lid (upside down)
Figure 4:
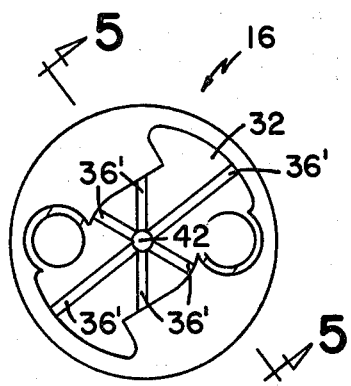
FIG. 4 is an underside plan view of the container lid of FIG. 2, without the connecting lead posts and plate connecting straps; .

In accordance with the invention, at the interface between the bottom edge extension 28 of the cell pack and the bottom surface 30 of the container jar there are provided channel means 36 which generally run transversely to the direction in which the edges of the plates and separators extend. In the case of the cylindrical cell pack, as best seen in FIG. 1 a plurality of channels 36 extend radially from a centrally located channel or manifold 40, defining a continuous finger-like passageway 38. This passageway is in communication with central void 34 and in turn filter hole 42, providing an unrestricted path for the electroltye to be delivered to a large portion of the bottom edge of the cell pack. As acid or other electrolyte is introduced into central void 34 and it is distributed radially into each of channels 36, the electrolyte thereby contacting all layers of the cell pack extension 28 and wicking upwardly more or less uniformly into the interleaved portion of the separator between adjacent plates. Because the separator is preferably compressed against the bottom, portion 35 protrudes into the channel passageways.

In likewise manner, the top 16 of the container is provided with similar channels 36', defining radial passageways 38' communicating with central vent opening 42, whereby acid or other electrolyte is delivered to the upper extension portion 28' of the cell pack and distributed thereover. Electrolyte is thereby distributed uniformly to the separator extension and thereafter flows downwardly in the interleaved portion between plates where it meets the electrolyte which has wicked upwardly from the lower portion of the cell.

The channels 36 not only provide passageways for electrolyte distribution during filling, but also redistribute any electrolyte which is expelled from the cell pack during overcharge or other abusive use. Moreover, the channels provide added mechanical strength to the underside of the container. In this respect, domed or arched channels tapering at 37 on their underside are preferred since they provide added strength to resist bulging of the cell container during use at superatmospheric pressure.

Figure 6:
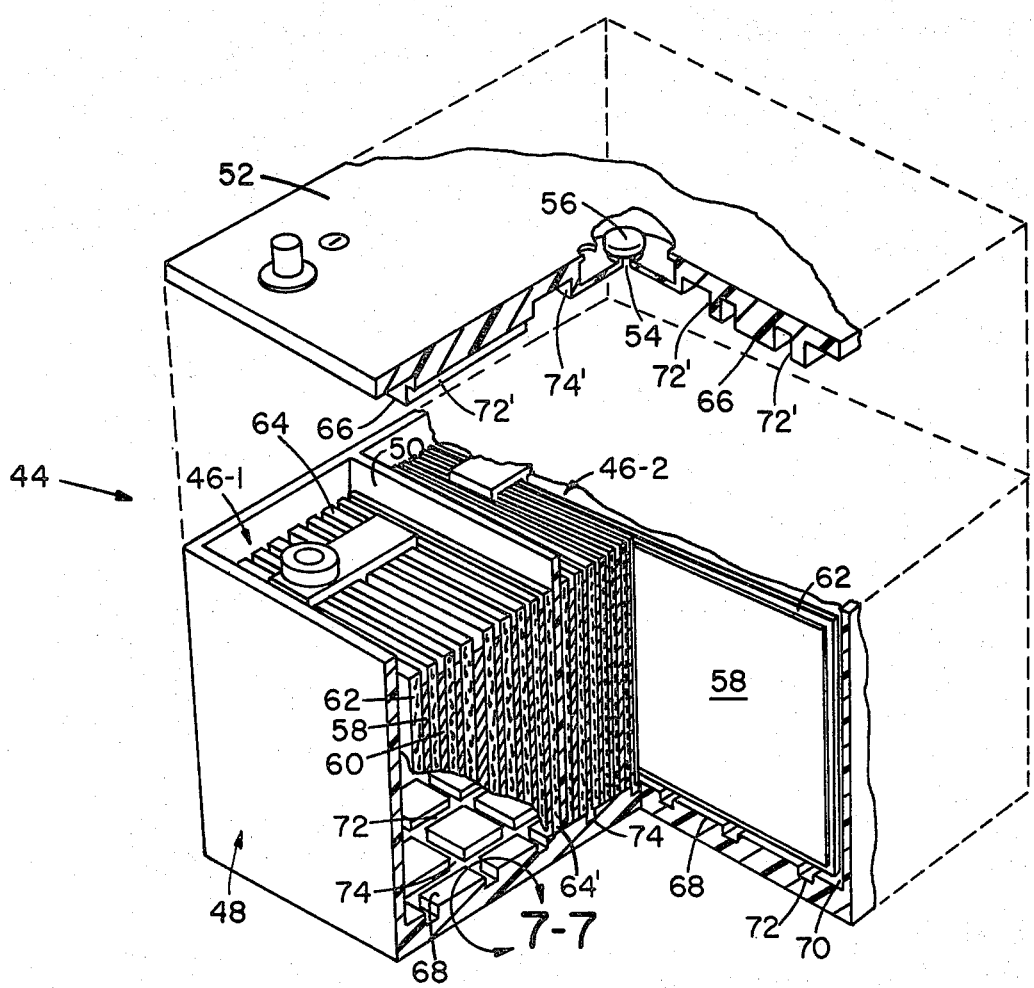
FIG. 6 depicts in perspective a partial cutaway view of a prismatic battery of the invention.

Turning now to the embodiment of FIG. 6, there is shown a prismatic battery at 44 comprising a plurality of series connected cells 46-1, 46-2, etc., electrically interconnected and sized to form a battery of desired voltage and capacity. The cells are housed in a monoblock container 48 and segragated by partitions 50 which may or may not be sealed to top 52. Top 52, however, is liquid and gas-tight sealed along its perimeter to the lower monoblock container 48 at its mouth opening. In the event that partitions 50 do not seal off the cells and a common head space is provided, a single filling port 54 may be provided, closed during operation of the battery by a resealable Bunsen valve 56. If partitions 50 segregate each cell in liquid tight fashion from one another, separate ports and valves are required for each cell.

Each cell, e.g., 46-1, is comprised of parallel stacked plates 58, 60 of opposite polarity between which absorbent separator layers 62 are interleaved and compressed between the plates. As in the previous embodiment, the separator layers are permitted to extend at 64, 64' above and below the plate edges, respectively, and are in substantial abutting contact with the substantially planar top undersurface 66 of lid 52 and substantially planar top surface 68 of the inside bottom of the container. There is also provided and end spacing 70 between the side edges of the cell pack and container wall to allow a path (similar in function to central void 34 in FIG. 2) for electrolyte to gravitate to the bottom of the individual cells during electrolyte filling.

The bottom of each cell is provided with one or more channels 72 extending generally transversely to the direction in which the edges of the plates and separators extend. In turn, these transverse channels are fed with electrolyte from side spaces 70 by interconnecting manifold channels 74 which run generally longitudinally with respect to the edges of the plates and separators. In this manner, the electrolyte is evenly distributed along the bottom of each cell and hence permits electrolyte to uniformly wick upwardly into the separator layers and plates.

Similarly, top 52 may be provided on its undersurface with transversely extending channels 72' and longitudinally extending manifolding channels 74'.

Figure 7:
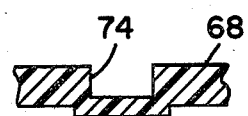
FIG. 7 is a partial sectional view of an alternative channel configuration of the container bottom similar to FIG. 6 and taken along 7—7.

As shown in FIG. 7, channels 74, for instance, may be reinforced at their bottom portion at 75 to provide added strength in the area of the channel.

In the embodiment of FIG. 8, a battery similar to that of FIG. 6 is shown, however the individual cells 76-1, 76-2, etc., are housed in flexible polymeric bags 78 which are open at their top, and which serve as the intercell partitions of the battery. Each cell, e.g., 76-1, comprises the usual opposite polarity plates 80, 82 sandwiched between compressible absorbent separator layers 84 which extend beyond the plate edges above and below the cell pack. Substantial abutting contact is made between substantially planar top 86 and the upper extending portion 84' of the separator layers. The lower extensions of the separator do not make contact with the cell container bottom by virtue of the interposed flexible polymeric bag 78. The cell packs may have flat parallel plates, flat wound plates or other configuration.

Figure 10:
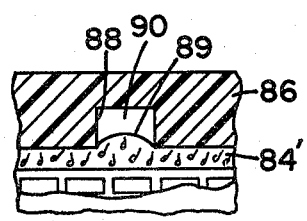
FIG. 10 is a view along 10—10 of FIG. 8.

In this embodiment as shown in FIG. 10, the top cover 86 is provided with channels 88 (defining passageways 90) extending generally transversely to the direction in which the edges of the plates and separator extend. Separator portions 89 protrude into the passageways. These transverse channels are in turn intercepted by at least one longitudinally extending, manifolding channel 92 which in turn is in fluid communication with a central electrolyte filler vent hole 94 (which may be capped with a suitable Bunsen valve, not shown).

Figure 9:
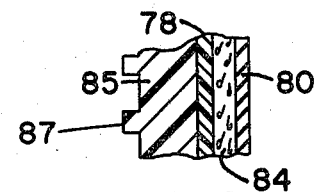
FIG. 9 is an enlarged sectional view along 9—9 of FIG. 8 illustrating a further feature.

As shown in the alternative of FIG. 9 the sidewall 85 of the container may be provided with horizontally extending ribs 87 serving to strengthen the case to minimize bulging during internal superatmospheric pressure buildup.

Figure 11:
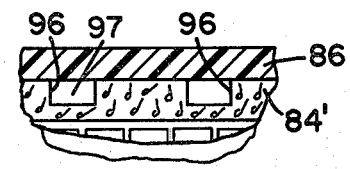
FIG. 11 is a partial sectional view along 11—11, showing an alternative modification of the channel means.

In an alternative embodiment shown in FIG. 11, the channel means may be provided by notches or slots 96 provided in the separator extension portion 84' rather than in the container wall 86, and defining passageways 97. In this embodiment, as in the previous embodiments, the channel means is still formed at the interface between the extending edge of the cell pack and the abutting wall portion of the container. The previous embodiments of FIGS. 1-5 and 6 and 7 may also have the channel means provided by slotting of the extended separator material of the cell pack edge rather than the wall portion of the container.

Using this technique in the vacuum filling of 12.5 ampere hour lead-acid spirally wound cylindrical cells, the cells of the invention with channels provided in the top and bottom of the wound element separator extension portions (4 radial segments ¼ inch wide by ⅛ inch deep in the form of a "plus" in bottom extension 28, and 2 radial segments of the same dimension in the form of a "minus" in top extension 28'), had average fill times of about 30 seconds. In comparison, control cells without the channels took from 2 to 6 minutes to accept the same volume of acid as the cells of the invention. The cells were also autopsied and it was found that the cells of the invention were substantially uniformly filled, without evidencing dry bands, and the acid distribution appeared to be more uniform than the control cells.

In any of the embodiments the channel means (e.g., channels, notches or slots) may be of any desired cross-sectional configuration, and may be oriented other than prependicular to the direction in which the plates and separator edges extend. For instance, the crossing channels 72, 74 of the FIG. 6 embodiment may be replaced by diagonally extending channels originating at one corner of the cell and crossing to the diagonally opposite corner. In this manner the extended edges of each separator layer is traversed by the channel means which doubles as a manifold.

While certain representative embodiments and details have been shown for the purpose of illustrating the invention, it will be apparent to those skilled in this art that various changes and modification may be made therein without departing from the spirit or scope of the invention.

What is claimed is:

1. In an electrochemical cell of the limited electrolyte type having a cell pack comprised of absorbent separator interleaved and compressed between positive and negative plates, an electrolyte substantially fully absorbed within the separator and plates, and a container comprised of a jar having an opening and a lid closing said opening, the container encasing the cell pack and having a substantially planar end wall portion in substantial abutting contact with an edge of the cell pack, the improvement comprising:
    channel means formed at the interface between said edge of the cell pack and the abutting end wall portion of the container, providing at least one passageway promoting along the extent of said channel means, the substantially uniform distribution of electrolyte within the cell pack at least during filling of the cell with the electrolyte; and
    a substantially unrestricted path interconnecting the jar opening with the channel means insuring effective distribution of electrolyte to said interface.

2. The cell of claim 1 wherein the channel means are provided by depressed channels formed in the container end wall, which run transversely to the direction in which the edges of the plates and separator extend.

3. The cell of claim 1 wherein the absorbent separator extends beyond the edges of the positive and negative plates and forms said edge of the cell pack which is in substantial abutting contact with said end wall portion of the container.

4. In a spirally wound cylindrical electrochemical cell of the limited electrolyte type having a generally cylindrical cell pack comprised of porous positive and negative plates wound into a jelly-roll with interleaved absorbent separator, the separator extending beyond the edges of the plates at one or both ends (top or bottom) of the cell pack, the electrolyte being substantially fully absorbed in the plates and separators, and a container comprised of a jar having an opening and a lid closing said opening, the container encasing the cell pack and having a substantially planar end wall portion in substantial abutting contact with the extended portion of the separator, the improvement comprising:
    channel means formed at the interface between the extended portion of the separator and the abutting end wall portion of the container, providing at least one passageway at the interface for promoting electrolyte distribution to the separator and;
    a substantially unrestricted path interconnecting the jar opening with the channel means insuring effective distribution of electrolyte to said interface.

5. The cell of claim 4 wherein the channel means are provided by generally radially directed depressed channels formed in the container end wall, which run transversely to the direction in which the edges of the plates and separators extend.

6. A prismatic battery comprising:
    a plurality of electrically interconnected cells having parallel stacked cell packs comprised of substantially planar porous positive and negative plates between which are interleaved compressible electrolyte-absorbent porous separators, and electrolyte of limited amount substantially fully absorbed within the pores of the plates and separators;
    a monoblock container comprised of a jar having an opening and a lid closing said opening, the container housing the cells in normally sealed fashion and having substantially planar wall portions of said jar or lid making substantial abutting contact with end edges of said cell pack, the plane of said wall portions extending substantially perpendicularly to the plane of said plates;
    channel means formed at the interface between said edge of the cell pack and the abutting wall portion of the container, providing at least one passageway at the interface for promoting electrolyte distribution to the entire cell of each cell of the battery; and
    a substantially unrestricted path interconnecting the jar opening with the channel means insuring effective distribution of electrolyte to said interface.

7. The battery of claim 6 in which the individual cell packs are contained in open top polymeric bags, and wherein the channel means are formed at the interface between the top of the cell packs and the lid of the container.

8. The battery of claim 6 wherein the channel means are provided by depressed channels formed in the container wall, which run transversely to the direction in which the edges of the plates and separators extend.

9. The battery of claim 6 wherein the tops of the cells are interconnected by a common gas space.

10. In a rechargeable lead-acid electrochemical cell of the sealed gas recombining limited electrolyte type having a cell pack comprised of a plurality of substantially planar negative and positive plates stacked or wound together with interleaved absorbent separator compressed between the plates, the cell pack being defined by (i) sides and (ii) end portions corresponding to the longitudinal edges of the stack of plates and separators, an electrolyte substantially fully absorbed within the separator and plates, and a container comprised of a jar having an opening and a lid closing said opening, the container encasing the cell pack stack and having an end wall portion in substantial abutting contact with an end portion of said cell pack stack, the improvement comprising:

channel means formed at the interface between said end portion of the cell pack and the abutting end wall portion of the container, providing at least one passageway promoting the substantially uniform distribution of electrolyte within the cell pack stack at least during filling of the cell with the electrolye; and a substantially unrestricted path interconnecting the jar opening with the channel means insuring effective distribution of electrolyte to said interface.

11. The cell of claim 10 wherein said channel means are provided by depressed channels formed in the container end wall, which run transversely to the direction in which the edges of the plates and separator extend, and which are joined to a common manifold.

12. In an electrochemical cell of the limited electrolyte type having a cell pack comprised of absorbent separator interleaved and compressed between positive and negative plates, the separator extending beyond the plates at an edge of the cell pack, an electrolyte fully absorbed within the separator and plates, and a container encasing the cell pack and having a substantially planar end wall portion in substantial abutting contact with the extended portion of the separator at said edge of the cell pack, the improvement comprising:

channel means formed at the interface between said edge of the cell pack and the abutting end wall of the container, the channel means being provided by notches formed in the extended portion of the separator at the edge of the cell pack, providing at least one passageway promoting the substantially uniform distribution of electrolyte within the cell pack at least during filling of the cell with the electrolyte.

13. In an electrochemical cell of the limited electrolyte type having a cell pack comprised of absorbent separator interleaved and compressed between positive and negative plates, an electrolyte substantially fully absorbed within the separator and plates, and a container encasing the cell pack and having substantially planar end wall portions in substantial abutting contact with first and second edges of the cell pack at opposite ends thereof, the improvement comprising:

channel means formed at the interface between the first edge of the cell pack and the abutting end wall portion of the container, and channel means formed at the interface between the second edge of the cell pack at the opposite end thereof and the corresponding abutting end wall portion of the container, providing at least one passageway at each end of the cell promoting the substantially uniform distribution of electrolyte within the cell pack at least during filling of the cell with the electrolyte.

14. In a spirally wound cylindrical electrochemical cell of the limited electrolyte type having a generally cylindrical cell pack comprised of porous positive and negative plates wound into a jelly-roll with interleaved absorbent separator, the separator extending beyond the edges of the plates at both ends of the cell pack, the electrolyte being substantially fully absorbed in the plates and separators, and a container encasing the cell pack and having substantially planar end wall portions in substantial abutting contact with the extended portion of the separator at each end of the cell pack, the improvement comprising:

channel means formed at the interface between the extended portion of the separator and the abutting end wall portion of the container at both ends of the cell pack, providing at least one passageway at the interface at each end of the cell pack for promoting electrolyte distribution to the separator.

15. In an electrochemical cell of the limited electrolyte type having a cell pack comprised of absorbent separator formed of a microfine fiber glass material interleaved and compressed between positive and negative plates, an electrolyte substantially fully absorbed within the separator and plates, and a container encasing the cell pack and having a substantially planar end wall portion in substantial abutting contact with an edge of the cell pack, the improvement comprising:

channel means formed at the interface between said edges of the cell pack and the abutting end wall portion of the container, a portion of the separator extending beyond the edges of the plates and such portion protruding into said channel means, providing at least one passageway promoting the substantially uniform distribution of electrolyte within the cell pack at least during filling of the cell with the electrolyte.

16. In an electrochemical cell of the limited electrolyte type having a cell pack comprised of absorbent separator interleaved and compressed between positive and negative plates, the separator extending beyond the plates at an edge of the cell pack, an electrolyte absorbed within the separator and plates, and a container encasing the cell pack and having a wall portion in substantial abutting contact with the extended portion of the separator at said edge of the cell pack, the improvement comprising:

channel means formed at the interface between said edge of the cell pack and the abutting wall portion of the container, a portion of such separator extending beyond the edges of the plates and such portion protruding into said channel means, providing at least one passageway promoting the substantially uniform distribution of electrolyte to the separator.

* * * * *